US011873102B2

(12) United States Patent
Lalli et al.

(10) Patent No.: US 11,873,102 B2
(45) Date of Patent: Jan. 16, 2024

(54) IMPLEMENTATIONS OF DEPLOYABLE SEATBACK POCKETS

(71) Applicant: B/E Aerospace, Inc., Winston-Salem, NC (US)

(72) Inventors: Rodrigo A. Lalli, Kernersville, NC (US); Nathaniel Adam Fishel, Pfafftown, NC (US); Kanin Homsrivaranon, Pfafftown, NC (US); Brian D. Green, King, NC (US); Brett Alan Antonini, Kernersville, NC (US); Karen J Nanney, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 15 days.

(21) Appl. No.: 17/717,861

(22) Filed: Apr. 11, 2022

(65) Prior Publication Data

US 2023/0322388 A1 Oct. 12, 2023

(51) Int. Cl.
*B64D 11/06* (2006.01)
*B64D 11/00* (2006.01)

(52) U.S. Cl.
CPC .... *B64D 11/0636* (2014.12); *B64D 11/00151* (2014.12)

(58) Field of Classification Search
CPC ...................... B64D 11/0636; B64D 11/00151
See application file for complete search history.

(56) References Cited

U.S. PATENT DOCUMENTS 3,333,890 A 8/1967 Whitwam
8,152,234 B2 4/2012 Terleski et al.
8,596,723 B2 12/2013 Ahad
2009/0013357 A1 1/2009 Cassellia et al.
2017/0021931 A1* 1/2017 Stephens .......... B64D 11/00151
2017/0057415 A1 3/2017 Line et al.
2018/0201196 A1 7/2018 Hellman et al.
2019/0291870 A1 9/2019 Hall
2021/0061472 A1* 3/2021 Le .................... B64D 11/00151

FOREIGN PATENT DOCUMENTS

WO 1993008077 A1 4/1993
WO 2016089848 A1 6/2016
WO WO-2018057117 A1 * 3/2018 ......... B64D 11/0636

OTHER PUBLICATIONS

Extended European Search Report dated Aug. 22, 2023; European Application No. 23167075.3.

* cited by examiner

*Primary Examiner* — Anthony D Barfield
(74) *Attorney, Agent, or Firm* — Suiter Swantz pc llo

(57) ABSTRACT

A passenger seat and a row of passenger seats of a type wherein each seat includes a seatback for locating amenities for use by an aft-seated passenger. The seatback includes a video monitor positioned in an upper portion of the seatback, a first seatback pocket positioned below the video monitor, and a second seatback pocket positioned below the first seatback pocket. Each of the first and second seatback pockets includes a member configured to move apart from the seatback to facilitate access to a bottom of the respective seatback pocket. In embodiments, the first and second seatback pockets are positioned in respective first and second recesses formed in the seatback.

13 Claims, 4 Drawing Sheets

100
102
104
110
118
114
120
122
106
112
124
116
130
126
128
108

IMPLEMENTATIONS OF DEPLOYABLE SEATBACK POCKETS

TECHNICAL FIELD AND BACKGROUND

The present disclosure relates generally to passenger seats such as aircraft passenger seats, and more particularly to passenger seats including implementations of deployable seatback pockets.

Amenities such as tray tables, video monitors and literature pockets are commonly positioned in front of a seated passenger for accessibility and ease of use. In aircraft and other conveyances including like seating rows forming columns, seatbacks serve as the mounting location for such amenities. For example, video monitors may be positioned on the backside of the upper portion of a seatback and tray tables may be attached about a middle portion of the seatback and deploy to a horizontal use position.

Regarding seatback pockets for storing literature and other items, conventional passenger seat implementations include a singular pocket located below the video monitor. A fixed retention bar typically extends across the width of the seatback and defines the entrance into the pocket. Regardless of the configuration of the retention bar, the fixed nature does not allow access to the bottom of the pocket. Therefore, conventional pockets present a cleaning challenge to the cabin crew.

Accordingly, what is needed is a seatback pocket configuration that facilitates cleaning, as well a dual pocket design for a passenger seat for storing additional items.

SUMMARY OF THE INVENTIVE ASPECTS

To achieve the foregoing and other advantages, the inventive aspects disclosed herein are broadly directed to implementations of deployable pockets for passenger seats such as aircraft passenger seats.

According to a first aspect the present disclosure provides a passenger seat of a type including a seatback for locating amenities for use by an aft-seated passenger. The seatback includes a video monitor positioned in an upper portion of the seatback, a first seatback pocket positioned below the video monitor, and a second seatback pocket positioned below the first seatback pocket. Each of the first and second seatback pockets includes a member configured to move apart from the seatback to facilitate access to a bottom of the respective seatback pocket to facilitate cleaning.

In some embodiments, the first seatback pocket is positioned in a middle portion of the seatback and includes a frame member, first and second pins pivotally attaching the frame member to the seatback, first and second spring members associated with the respect first and second pins biasing the frame member toward the seatback, and a cover attached to the frame member. In use, pivoting an upper end of the frame member apart from the seatback loads the first and second springs.

In some embodiments, a horizontal divider divides the seatback into an upper portion and a lower portion, wherein the video monitor and the first seatback pocket are positioned above the horizontal divider and in the upper portion and the second seatback pocket is positioned below the horizontal divider and in the lower portion.

In some embodiments, the seatback includes a first recess formed in the upper portion and each of the video monitor and the first seatback pocket are positioned in the first recess such that a face of the video monitor is flush with a portion of the seatback surrounding the first recess and a cover of the first seatback pocket, when in a closed condition, is flush with the portion of the seatback surrounding the first recess. A second recess is formed in the lower portion and the second seatback pocket is positioned in the second recess.

In some embodiments, the first recess tapers in a direction of the horizontal divider.

In some embodiments, an entrance into the first seatback pocket is formed between a bottom of the first recess and a pivotable frame member of the first seatback pocket, and the entrance into the first seatback pocket is spaced apart from a bottom of the video monitor.

In some embodiments, the second seatback pocket includes a spring configured to provide a pre-loaded spring force for holding a retaining bar in a closed condition against the seatback, the spring including a length of wire extending horizontally along the retention bar and vertically from opposing ends of the retention bar to spaced positions on the seatback.

In another aspect, the present disclosure provides a passenger seating row including first and second laterally adjacent passenger seats, an armrest positioned to one side of the first passenger seat, and a shared armrest positioned between the first and second passenger seats. Each of the first and second passenger seats includes a seatback for locating amenities for use by an aft-seated passenger. Each seatback includes a video monitor positioned in an upper portion of the seatback, a first seatback pocket positioned below the video monitor, and a second seatback pocket positioned below the first seatback pocket.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

Figure 1:
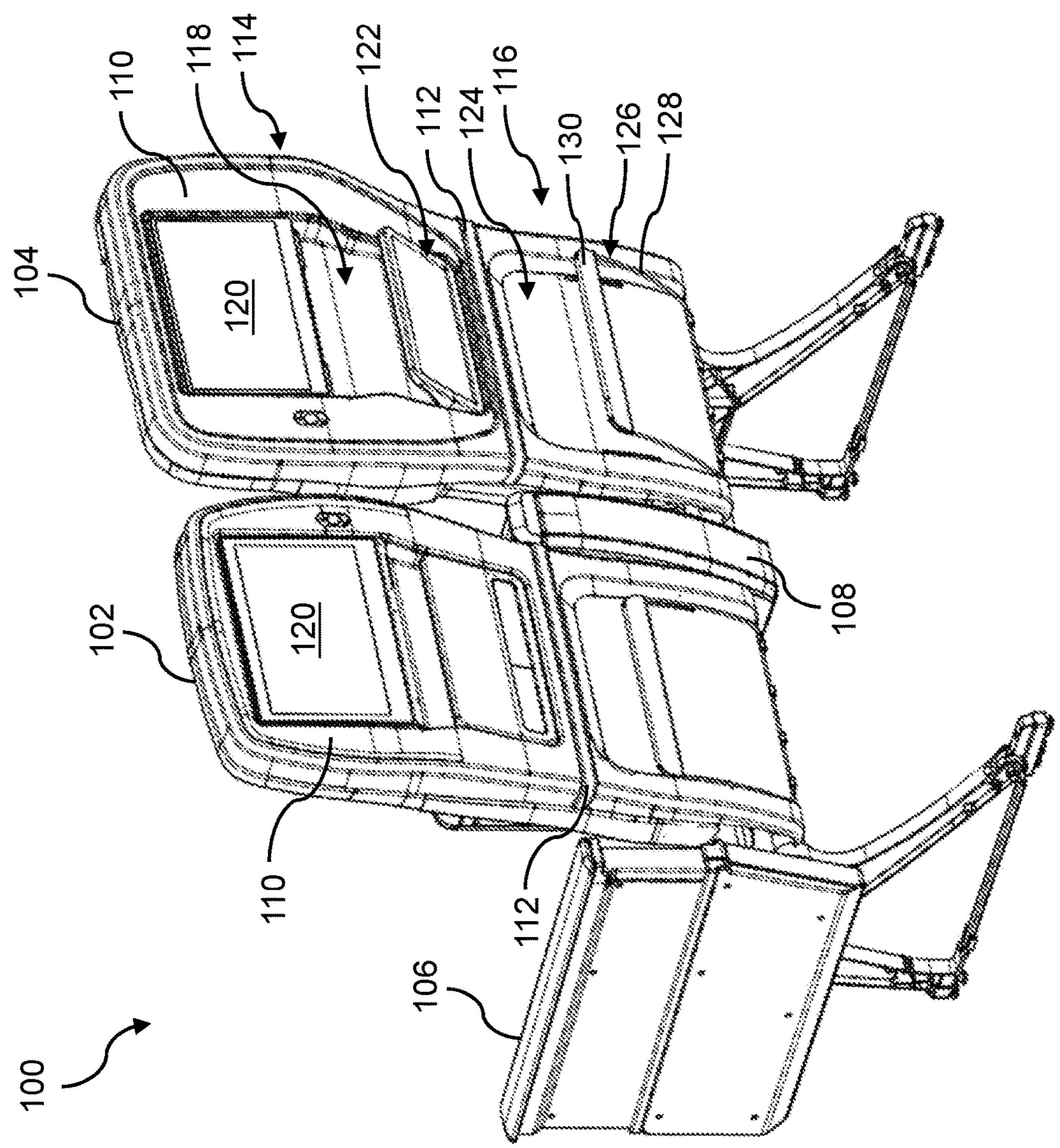
FIG. 1 is an isometric view of a seating row, according to an embodiment of the present disclosure, wherein each seat in the row is equipped with two deployable seatback pockets.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly speaking, embodiments of the inventive concepts disclosed herein are directed to passenger seats including implementations of deployable seatback pockets.

Referring to FIG. 1, a passenger seating row according to an embodiment of the present disclosure is shown generally at reference numeral 100. The seating row 100 includes at least a first passenger seat 102 and a second passenger seat 104 positioned to one side of or laterally adjacent the first passenger seat 102. In some implementations, the passenger seating row 100 may be positioned adjacent a longitudinal aisle such as an aircraft longitudinal aisle. In such implementations, an armrest 106 may be positioned to one side of the first passenger seat 102 opposite the second passenger seat 104. A shared armrest 108 may be positioned between the first and second passenger seats 102, 104 for use by both passengers. The outboard armrest for the second passenger seat 104 may be positioned on the side of the second passenger seat 104 opposite the first passenger seat 102 or may be positioned on the fuselage wall. In some embodiments, the passenger seating row 100 includes at least one additional passenger seat positioned laterally adjacent the second passenger seat 104. Armrests may be adjustable, may house deployable tray tables, and may serve to locate seat controls.

Each passenger seat 102, 104 generally includes a seatback 110 that functions as a mounting location for amenities for use by an aft-seated passenger positioned in a like seating row in a column of like seating rows. The seatback 110 of each seat extends from a headrest proximate a top of the seatback to a bottom of the seatback pivotally attached to a seat frame. A horizontal divider 112 divides the seatback 110 into an upper portion 114 positioned above the divider and a lower portion 116 positioned below the divider 112. Each of the upper and lower portions 114, 116 forms a recess for locating passenger amenities.

A first recess 118 positioned in the upper portion 114 tapers in a direction of the divider 112. The first recess 118 is a singular recess defining upper and lower parts. A video monitor 120 is positioned in the upper part generally opposite the headrest portion of the seat. A shown, the video monitor 120 faces the aft-seated passenger and the face of the video monitor aligns flush with the recess surrounding portion of the seatback. In some embodiments, the video monitor 120 is tilt-adjustable to change the viewing angle responsive to seatback recline.

A first deployable seatback pocket 122 is positioned in the first recess 118 below and spaced apart from the video monitor 120. The first deployable seatback pocket 122 is positioned in generally the middle portion of the seatback where a deployable tray table would typically be located. An entrance into the first deployable seatback pocket 122 is formed between the seatback, at the location of the first recess 118, and a pivoting member of the first seatback pocket as discussed further below. The entrance into the pocket is spaced apart from the bottom of the video monitor 120 such that items can be accessed and inserted into the pocket with interference by the video monitor. In use, the first seatback pocket 122 deploys from a closed condition shown on seat 102 to an open condition shown on seat 104. The first seatback pocket 122 can be opened to access items and/or for cleaning the pocket, and items are insertable into and retrievable from the pocket in either of the open and closed conditions.

With continued reference to FIG. 1, a second recess 124 is formed in the lower portion 116 of the seatback 110. A second deployable seatback pocket 126 is positioned in the second recess 124. In some embodiments, the second deployable pocket 126 is implemented as a spring 128 configured to provide a pre-loaded spring force for holding a retention bar 130 in a closed condition. In some embodiments, the spring 128 includes a length of wire extending horizontally along the retention bar 130 and vertically from opposing ends of the retention bar to spaced positions on the seatback. In use, the retention bar 130 deploys from a closed condition proximate the seatback 110 as shown on seat 102 to an open condition apart from the seatback as shown on seat 104.

In a particular implementation, the spring 128 may be mounted on either end to a respective movable or static element of the passenger seat. For example, the movable element may be the seatback. For example the static element may be a seat carriage assembly, such as a seat spreader, seat leg, or a lateral beam extending between passenger seats of a passenger seating row. In certain embodiments, the pocket spring provides a pre-loaded spring force for holding the seatback pocket in a closed condition against a rear surface of a seatback. The pocket spring may include a first length of a wire that extends vertically above and between inner surfaces of a pair of static elements on either side of the seat in a substantially horizontal direction and forming an upper edge of the seatback pocket. A pair of second lengths of wire may extend from respective ends of the first length of wire in a substantially vertical direction to the respective static elements to form side edges of the seatback pocket. A pair of coils may be formed at ends of the second lengths of wire, which are mounted to a respective receiving element on a respective inner surface of the pair of static elements such that an axis of the pair of coils is aligned horizontally and perpendicularly to the inner surfaces of the pair of static elements. A pair of extension members may extend from each of the coils that contact a complementary contact point on the inner surfaces the static elements to maintain the pre-loaded spring force on the coils. A pocket panel may cover and enclose the pocket spring to form a pocket portion of the seatback pocket that holds items within the pocket panel.

Figure 2:
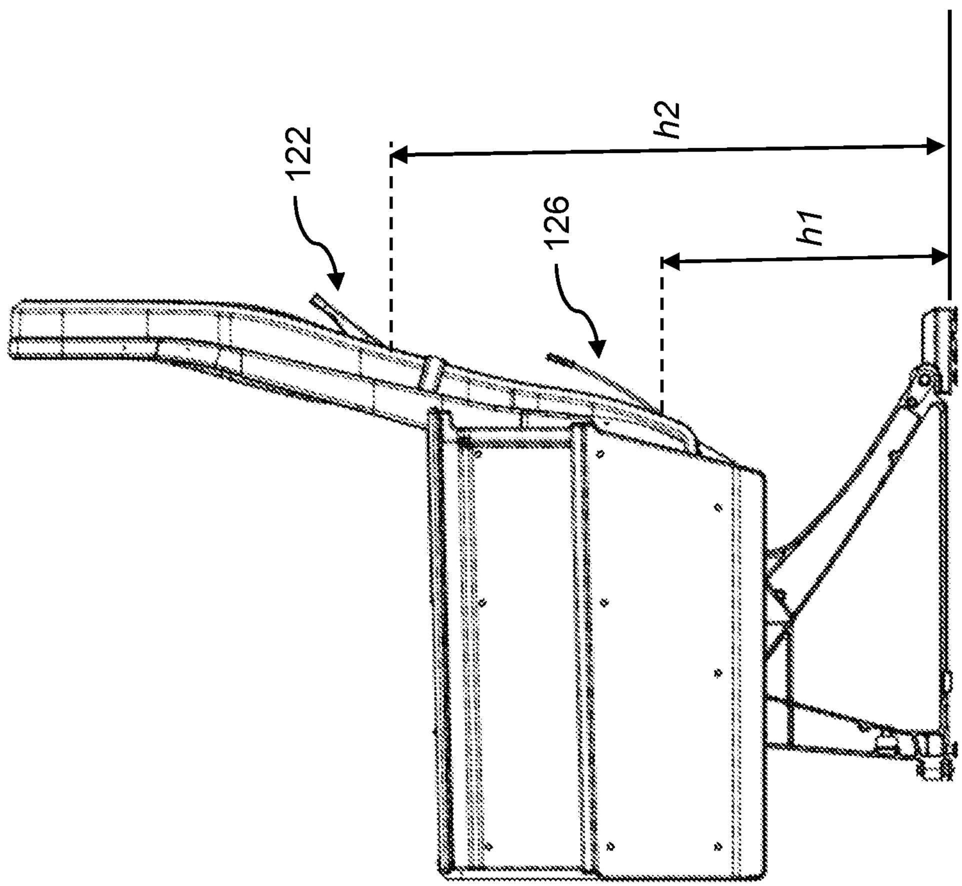
FIG. 2 is a side view of the seating row of FIG. 1 showing the relative positions of the two seatback pockets.

Referring to FIG. 2, the second seatback pocket 126 is positioned below the first seatback pocket 122 on the seatback, and the two pockets are spaced apart such that neither one interferes with the use of the other. In a particular embodiment, the axis of rotation of the second seatback pocket 126 is positioned at a height h1 of about 30 cm (i.e., about 12 inches) above the floor, and the axis of rotation of the first seatback pocket 122 is positioned at a height h2 about 66 cm (i.e., about 26 inches) above the floor. In a particular embodiment, the axis of rotation of the first seatback pocket 122 is positioned at least 63.5 cm above the floor, and thus above a 63.5 cm (i.e., about 24.99 inches) maximum height of armrests, to provide better visibility into the pocket. In a particular embodiment, at least one of the first and second seatback pockets 122, 126 deploys about 6 cm (i.e., about 2.5 inches) from the seatback to show the bottom surface of the pocket for cleaning.

Figure 3:
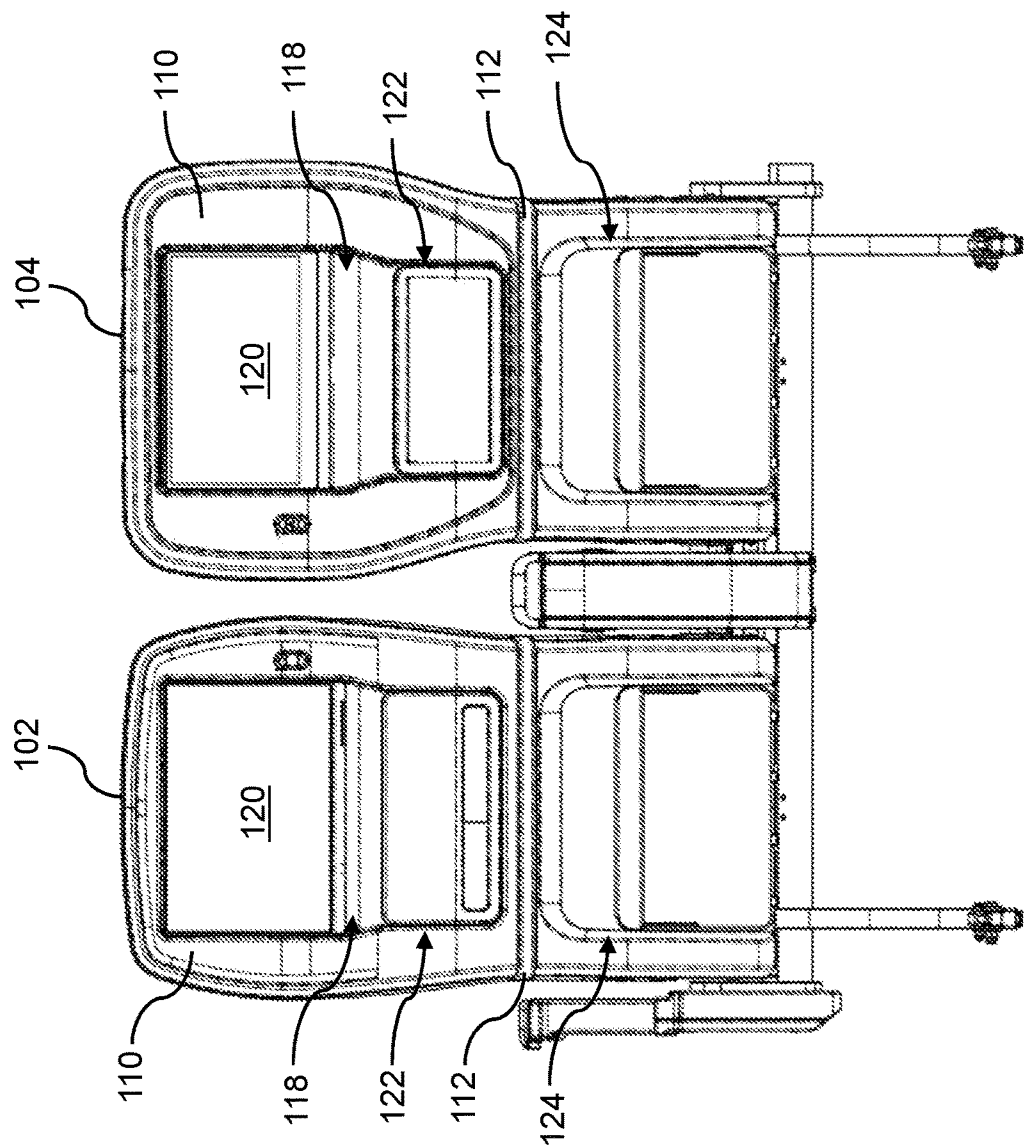
FIG. 3 is a back view of the seating row of FIG. 1 showing the positions of the two seatback pockets relative to the video monitor.

Referring to FIG. 3, implementations of the first seatback pocket 122 include a plastic cover as shown on seat 102 or plastic trim with netting as shown on seat 104. FIG. 3 further shows the tapering of the first recess 118 toward the horizontal divider 112 which corresponds to the tapering shape of the seatback. The first recess 118 is framed by the closeout of the surrounding seatback 110, and the video monitor 120 and the first seatback pocket 122, when stowed or closed, reside flush with the seatback for aesthetics and safety. The second or lower recess 124 is also framed by the surrounding seatback portion. Each of the first and second recesses 118, 124 are positioned laterally inward of the seatback 110. The seatback 110 may be constructed from hard plastics and like materials.

Figure 4:
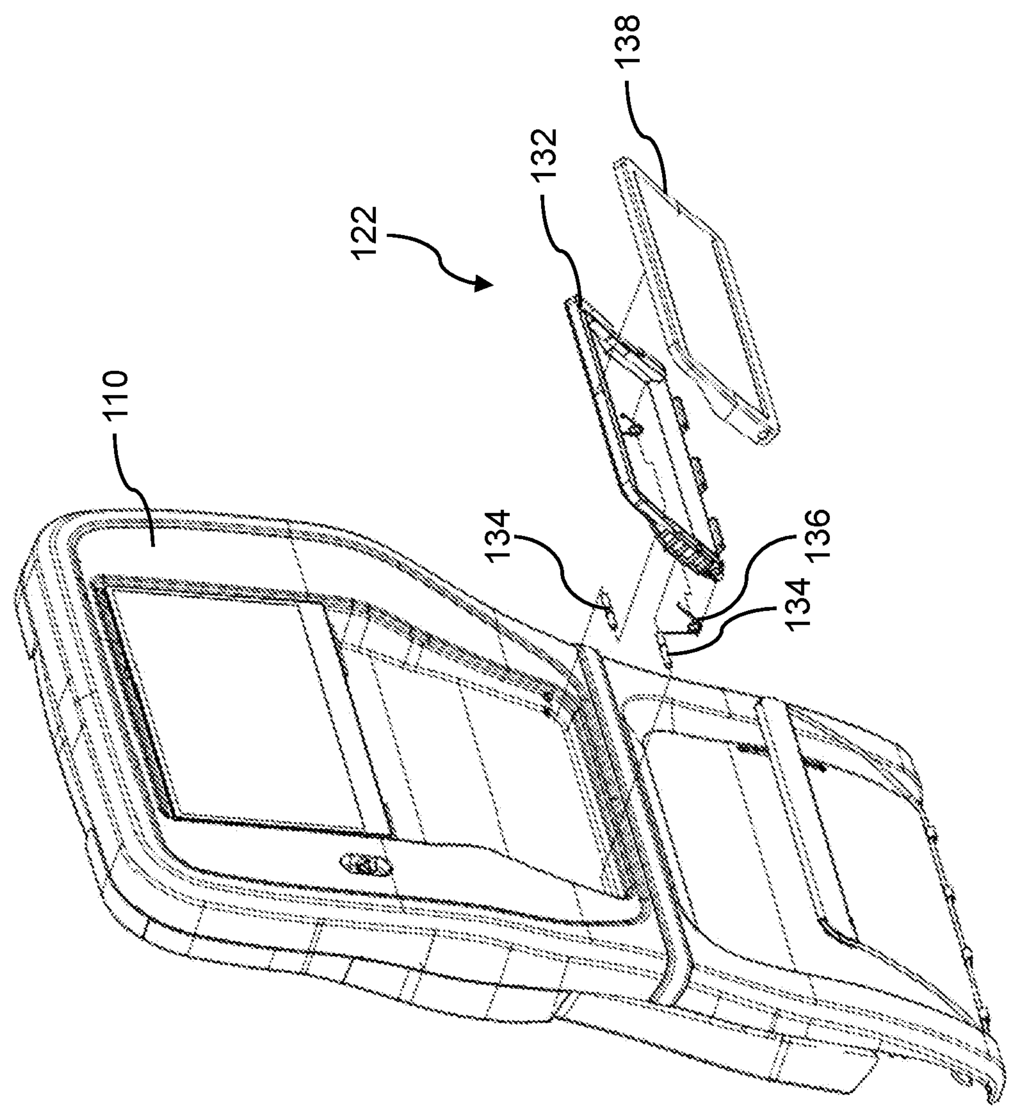
FIG. 4 is an exploded view of the deployable middle seatback pocket.

Referring to FIG. 4, according to a non-limiting example, the first seatback pocket 122 includes a frame member 132 pivotally attached to the seatback 110. First and second pins 134 rotatably couple the frame member 132 to the seatback 110 and define the axis of rotation of the frame member. First and second torsion springs 136 associated with the first and second pins 134, respectively, bias the frame member 132 in the direction of the seatback corresponding to a closed condition of the first seatback pocket 122. A cover 138 attaches to the frame member 132 to close out the open face of the frame member. In use, pulling the top edge of the frame member 132 away from the seatback 110 loads the torsion springs. Release of the frame member 132 causes the loaded torsion springs 136 to return the frame member to the closed position. The seatback pocket is collectively formed by the bottom of the recess, internal side of the frame member 132 and/or cover 138, and sides of the recess.

In alternative embodiments, the first and second seatback pocket types may be interchanged or both pockets implemented as a pivotable frame member type or a retention bar type as described herein above. The implementations of seatback pockets described herein are compatible with other passenger seat amenities including, but not limited to, tray tables, lighting, controls, etc.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A passenger seat of a type including a seatback for locating amenities for use by an aft-seated passenger, comprising:

a video monitor positioned in an upper portion of the seatback;

a first seatback pocket positioned below the video monitor; and a second seatback pocket positioned below the first seatback pocket;

wherein each of the first and second seatback pockets includes a member configured to move apart from the seatback to facilitate access to a bottom of the respective seatback pocket; and wherein the first seatback pocket is positioned in a middle portion of the seatback and comprises:

a frame member;

first and second pins pivotally attaching the frame member to the seatback;

first and second spring members associated with the respect first and second pins, the first and second spring members biasing the frame member toward the seatback; and a cover attached to the frame member;

wherein, in use, pivoting an upper end of the frame member apart from the seatback loads the first and second springs.

2. The passenger seat according to claim 1, wherein a horizontal divider divides the seatback into an upper portion and a lower portion, wherein the video monitor and the first seatback pocket are positioned above the horizontal divider and in the upper portion and the second seatback pocket is positioned below the horizontal divider and in the lower portion.

3. The passenger seat according to claim 2, wherein:

a first recess is formed in the upper portion and each of the video monitor and the first seatback pocket are positioned in the first recess such that a face of the video monitor is flush with a portion of the seatback surrounding the first recess and a cover of the first seatback pocket, when in a closed condition, is flush with the portion of the seatback surrounding the first recess; and a second recess is formed in the lower portion and the second seatback pocket is positioned in the second recess.

4. The passenger seat according to claim 3, wherein the first recess tapers in a direction of the horizontal divider.

5. The passenger seat according to claim 3, wherein an entrance into the first seatback pocket is formed between a bottom of the first recess and a pivotable frame member of the first seatback pocket.

6. The passenger seat according to claim 5, wherein the entrance into the first seatback pocket is spaced apart from a bottom of the video monitor.

7. The passenger seat according to claim 1, wherein the second seatback pocket includes a spring configured to provide a pre-loaded spring force for holding a retaining bar in a closed condition against the seatback, the spring including a length of wire extending horizontally along the retention bar and vertically from opposing ends of the retention bar to spaced positions on the seatback.

8. A passenger seating row, comprising:

at least first and second laterally adjacent passenger seats;

an armrest positioned to one side of the first passenger seat; and a shared armrest positioned between the first and second passenger seats;

wherein each of the first and second passenger seats includes a seatback for locating amenities for use by an aft-seated passenger, the seatback comprising:

a video monitor positioned in an upper portion of the seatback;

a first seatback pocket positioned below the video monitor; and a second seatback pocket positioned below the first seatback pocket;

wherein each of the first and second seatback pockets includes a member configured to move apart from the seatback to facilitate access to a bottom of the respective seatback pocket; and wherein the first seatback pocket is positioned in a middle portion of the seatback and comprises:

a frame member;

first and second pins pivotally attaching the frame member to the seatback;

first and second spring members associated with the respect first and second pins, the first and second spring members biasing the frame member toward the seatback; and a cover attached to the frame member;

wherein, in use, pivoting an upper end of the frame member apart from the seatback loads the first and second springs.

9. The passenger seating row according to claim 8, wherein a horizontal divider divides the seatback into an upper portion and a lower portion, wherein the video monitor and the first seatback pocket are positioned above the horizontal divider and in the upper portion and the second seatback pocket is positioned below the horizontal divider and in the lower portion.

10. The passenger seating row according to claim 9, wherein:

a first recess is formed in the upper portion and each of the video monitor and the first seatback pocket are positioned in the first recess such that a face of the video monitor is flush with a portion of the seatback surrounding the first recess and a cover of the first seatback pocket, when in a closed condition, is flush with the portion of the seatback surrounding the first recess; and a second recess is formed in the lower portion and the second seatback pocket is positioned in the second recess.

11. The passenger seating row according to claim 10, wherein the first recess tapers in a direction of the horizontal divider.

12. The passenger seating row according to claim 10, wherein an entrance into the first seatback pocket is formed between a bottom of the recess and a pivotable frame member of the first seatback pocket, and wherein the entrance into the first seatback pocket is spaced apart from a bottom of the video monitor.

13. The passenger seating row according to claim 8, wherein the second seatback pocket includes a spring configured to provide a pre-loaded spring force for holding a retaining bar in a closed condition against the seatback, the spring including a length of wire extending horizontally along the retention bar and vertically from opposing ends of the retention bar to spaced positions on the seatback.

* * * * *